United States Patent
Hoekstra et al.

(12)

(10) Patent No.: US 10,577,500 B2
(45) Date of Patent: Mar. 3, 2020

(54) PROCESS FOR THE PREPARATION OF A SEMI-CRYSTALLINE SEMI-AROMATIC POLYAMIDE

(71) Applicant: DSM IP Assets B.V., Heerlen (NL)

(72) Inventors: Johannes Hoekstra, Echt (NL); Rudy Rulkens, Echt (NL); Hans Klaas Dijk,Van, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 347 days.

(21) Appl. No.: 15/321,406

(22) PCT Filed: Jun. 26, 2014

(86) PCT No.: PCT/EP2014/063584
§ 371 (c)(1),
(2) Date: Dec. 22, 2016

(87) PCT Pub. No.: WO2015/197124
PCT Pub. Date: Dec. 30, 2015

(65) Prior Publication Data
US 2017/0152382 A1    Jun. 1, 2017

(51) Int. Cl.
| | | |
|---|---|---|
| C08L 77/06 | (2006.01) |
| C08G 69/26 | (2006.01) |
| C08G 69/28 | (2006.01) |
| C08G 69/30 | (2006.01) |
| C08K 7/14 | (2006.01) |
| C08K 3/40 | (2006.01) |
| C08L 77/00 | (2006.01) |
| C08G 81/00 | (2006.01) |
| B29B 7/00 | (2006.01) |
| B29B 7/82 | (2006.01) |
| B29C 45/00 | (2006.01) |
| B29C 45/72 | (2006.01) |
| B29K 77/00 | (2006.01) |

(52) U.S. Cl.
CPC .............. *C08L 77/06* (2013.01); *B29B 7/002* (2013.01); *B29B 7/82* (2013.01); *B29C 45/0001* (2013.01); *B29C 45/72* (2013.01); *C08G 69/265* (2013.01); *C08G 69/28* (2013.01); *C08G 69/30* (2013.01); *C08G 81/00* (2013.01); *C08K 3/40* (2013.01); *C08K 7/14* (2013.01); *C08L 77/00* (2013.01); *B29K 2077/10* (2013.01); *C08L 2205/025* (2013.01)

(58) Field of Classification Search
CPC ..... C08L 77/06; C08L 77/00; C08L 2205/025
USPC ................. 524/606, 607, 538; 264/328.1
See application file for complete search history.

(56) References Cited

U.S. PATENT DOCUMENTS

| | | | |
|---|---|---|---|
| 3,839,296 | A | 10/1974 | Campbell |
| 2012/0245283 | A1* | 9/2012 | Desbois ............... C08G 69/265 524/607 |

FOREIGN PATENT DOCUMENTS

| | | |
|---|---|---|
| EP | 1 170 335 | 1/2002 |
| EP | 1 262 525 | 12/2002 |
| EP | 2 471 866 | 7/2012 |
| EP | 2 610 313 | 7/2013 |
| GB | 801733 | 9/1958 |
| WO | WO 2011/069942 | 6/2011 |
| WO | WO 2012/156227 | 11/2012 |
| WO | WO 2012/175293 | 12/2012 |

OTHER PUBLICATIONS

Novitsky "Eutectic melting behavior of polyamide 10,T-co-6,T and 12,T-co-6,T copolyterephthalamides." Polymer 51 (2010) 2417-2425. (Year: 2010).*
International Search Report for PCT/EP2014/063584, dated Sep. 5, 2014, 4 pages.
S.N. Vouyiouka et al., "Solid State Polymerization", Science Direct Prog. Polym. Sci 30, vol. 30, No. 1, Jan. 7, 2005, pp. 10-37.

* cited by examiner

*Primary Examiner* — Tri V Nguyen
(74) *Attorney, Agent, or Firm* — Nixon & Vanderhye P.C.

(57) ABSTRACT

The invention relates to a process for the preparation of a semi-crystalline semi-aromatic polyamide copolymer (Co-PA) having a melting temperature (Tm-Co-PA) of at least 300° C., comprising steps of (a) preparing a first semi-crystalline semi-aromatic polyamide (A), having a melting temperature (Tm-A) of at least 310° C.; and consisting of repeat units derived from 45-50 mol % terephthalic acid; 47.5-50 mol % of diamine; and 0-5 mol % of one or more other amine and/or acid group containing components; the mol % being relative to the total molar amount of said amine and/or acid group containing components; and wherein poly-amide (A) is prepared by a process comprising direct solid-state polymerization of a diamine-dicarboxylic acid salt of the terephthalic acid and the diamine; (b) providing a polyamide (B), being an amorphous polyamide having a glass transition temperature (Tg-B) below Tm-A, or a second semi-crystalline polyamide having a melting temperature (Tm-B) below Tm-A, or a combination of the amorphous polyamide and the second semi-crystalline polyamide; (c) heating and melt-mixing polyamide (A) and polyamide (B), thereby obtaining a miscible polymer melt with a temperature (T-melt) above Tm-A; and (d) cooling the melt to a temperature below the solidification temperature of the melt, thereby obtaining a solid semi-crystalline semi-aromatic polyamide copolymer.

21 Claims, 1 Drawing Sheet

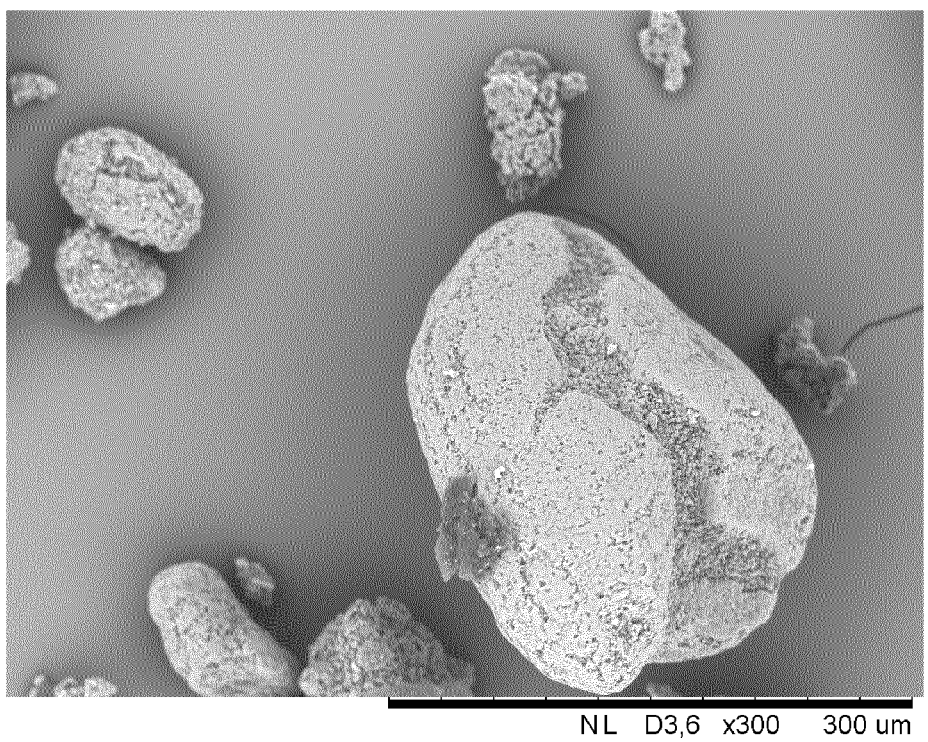

PROCESS FOR THE PREPARATION OF A SEMI-CRYSTALLINE SEMI-AROMATIC POLYAMIDE

This application is the U.S. national phase of International Application No. PCT/EP2014/063584 filed Jun. 26, 2014, the entire contents of which is hereby incorporated by reference.

The invention relates to a process for the preparation of a semi-crystalline semi-aromatic polyamide, more particular a semi-crystalline semi-aromatic polyamide copolymer having a melting temperature of at least 300° C.

Semi-crystalline polyamides are generally prepared by liquid phase polymerization, optionally in the presence of water, such as melt polymerization or solution polymerization. Amorphous polyamides are generally made by melt-polymerization. After this liquid phase polymerization, the resulting polymer, or prepolymer thereof, is either isolated from the solution or the melt is cooled to solidify. Such liquid phase polymerization may optionally be followed by a solid state post-condensation step, to obtain a polyamide polymer with a higher molecular weight. Furthermore, in the literature also solid state polymerization processes involving direct solid state polymerization of nylon salts are described. Herein the polymerization is carried out such that during the whole polymerization process from salt to polymer, the starting salt, the intermediate products and final product remain in the solid state, or essentially so and thus never fully liquefy. Direct solid state processes are reported to be more suitable for aliphatic polyamides, because the aliphatic monomers used herein are already more reactive at processing conditions for conventional processes and because of the low reaction temperatures involved in such direct solid state processes. According to R. Pfaender in the book on "Solid-state Polymerization" by C. D. Papaspyrides and S. N. Vouyiouka, Wiley, 2009, page 167, citing publications by C. D. Papaspyrides and other authors, the reaction rate of the solid state process is not high enough for practical use and is significantly lower than for comparable melt or solvent processes.

Semi-crystalline semi-aromatic polyamide copolymers, abbreviated herein as Co-PA, with high melting temperature (Tm), for example with Tm above 280° C., more particular above 300° C., are of interest for many applications because of their high temperature properties. Such polyamides are generally copolyamides obtained from diamine and dicarboxylic acid. Herein the dicarboxylic acid can be an aromatic dicarboxylic acid, such as terephthalic acid, which is combined with a mixture of different aliphatic diamines. More commonly, the dicarboxylic acid comprises a combination of different dicaboxylic acids, for example terephthalic acid and isophthalic acid, or terephthalic acid and adipic acid, or even terephthalic acid, adipic acid and isophthalic acid. The diamine may also comprise a mixture of different diamines. For such polyamides multistep processes are applied, such as solution polymerization, melt polymerization, or solution polymerization followed by melt polymerization, each optionally combined with solid state post condensation. Aromatic dicarboxylic acids, such as terephthalic acid and isophthalic acid, are known to be significantly less reactive than aliphatic dicarboxylic acids, such as adipic acid, as reported e.g. in the study of "The condensation Kinetics of Polyphthalamides: I. Diamines and Diacids of Dimethylesters" done by Malluche J.; Hellmann, G. P.; Hewel M.; Liedloff, H. J.; Polym. Eng. Sci., 2007, 47, 1589. Because of the higher melting points of the semi-crystalline semi-aromatic polyamides based on terephthalic acid, and lower reactivity of the aromatic dicarboxylic acids, generally higher reaction temperatures are needed which can result in undesired side reactions. For example intermolecular condensation reaction of diamines results into components with higher functionality which leads to branching of the polyamides, and can result in gelation (cf. Katsuaki, K.; Shinji, M.; Kobunshi Kagaku, 1968, 25, 318; and M. I. Kohan, Nylon Plastics Handbook, Hanser, 1995, p 592-593). One of the ways to prevent gelation by this type of side reaction is to add mono-functional carboxylic acids or amines, which act as chain stoppers. On the other hand short diamines like 1,4-diaminobutane and 1,5-diaminopentane undergo cyclization by internal amine condensation leading to mono-functional amines and therefore restricting the build-up of higher molar mass polyamide. The preparation of high melting semi-crystalline polyamides is therefore more complicated or problematic than for lower melting semi-aromatic or amorphous semi-aromatic polyamides. Furthermore, the longer reaction times result in reduced plant capacity utilization compared to aliphatic polyamides.

Preparation of high-melting polyamide copolymers by processes not involving melt polymerization shows other problems. For example, in a process comprising solution polymerization combined with solid state post condensation, first a salt solution has to be prepared and be polymerized into a prepolymer in solution and under corresponding high pressure. This prepolymer is then isolated from the solution, for example by flashing, with the aim to obtain the prepolymer in the form of a powder. Prepolymers generally have a much lower glass transition temperature and melt temperature than the corresponding high molecular weight polymers. While generally copolymers already have a lower glass transition temperature and melt temperature then the corresponding homopolymers, this effect is even more emphasized in prepolymers of copolymers based on a combination of aliphatic dicarboxlic acid and aromatic dicarboxlic acid. The presence of traces of water remaining in the flashed prepolymer can suppress the melting temperature even further. These facts together contribute to problems preventing formation of a dry and easy flowing powder, and resulting in occurrence of sticking. As a result thereof the workability of the prepolymer powder can be very difficult. Solid state post condensation in a continuous process of the prepolymer powder as such manner would be hard not very practical, due to the sticking and flowing problems with such powder. Solid state post condensation of such powder might be performed batch wise in a tumble drier, however resulting in extremely low capacity utilization and creating all kind of problems with fouling of the reactor. For solid state post condensation the powder would conveniently be compacted into granules, to allow for a continuous process in a densely packed column. However, it was observed by the inventors when a semi-aromatic polyamide copolymer was prepared in this way, the granulated powder still showed sticking problems when applied in a continuous process with a moving bed reactor, likewise due to low melting temperatures of prepolymers derived from mixtures of different diacids and/or different diamines.

In the preparation of high-melting polyamide copolymers by direct solid state polymerization similar problems were observed. When salt powders prepared from mixtures of different diacids and/or different diamines were polymerized by direct solid state polymerization, the temperature during the polymerization had to be kept low to prevent sticking of the powder and fouling of the reactor, likewise also due to low melting temperatures of the prepolymers. The low polymerization temperatures in turn lead to very long reaction times for the aromatic dicarboxylic acids. This problem is in particular emphasized when the semi-crystalline polyamide copolymer is derived from dicarboxylic acids comprising isophthalic acid or an aliphatic dicarboxylic acid, and/or from diamines comprising a mixture of three or more different diamines, and in particular when comprising long chain aliphatic diamines.

The aim of the present invention is to provide an optimized process for producing semi-crystalline semi-aromatic polyamide copolymer (Co-PA) with a melting temperature of at least 300° C.

This aim has been achieved with the process according the invention as in claim 1.

The effects of the process according to the invention are that a copolyamide with a high melting temperature is obtained in an efficient manner, with reduced problems of sticking or even preventing sticking, compared to processes wherein the corresponding copolyamide is prepared starting from all the monomers combined in a single mixture, the occurrence of side reactions is limited and the copolyamide can be obtained with a high molecular weight with a reduced risk of gelation.

Components polyamide (A) and polyamide (B) are produced at relative low temperature, and said components polyamide (A) and polyamide (B) are exposed to a high temperature only for a short time during the melt mixing step. Even though polyamide (A) has a melting temperature even higher than that of the resulting Co-PA, its preparation is carried out at a temperature far below the melting temperature of the Co-PA, in a direct solid-state process, thereby significantly reducing the possible occurrence of side reactions. Moreover, despite the low reaction temperature, such process is accomplished even in a relative short time. The absence of aliphatic dicarboxylic acids, or essentially so, during the preparation of polyamide (A) allows the use of relative high reaction temperatures, still below the melting temperature of the salt, meanwhile still achieving a relative high reaction rate and relative short reaction times. Polyamide (B) has a melting temperature, or glass transition temperature, that is lower than that of the resulting Co-PA, and therefore can be obtained from any suitable polymerization process, such as a melt polymerization process or a solution process, or a combination thereof, or even a direct solid state polymerization process carried out at more moderate process conditions. The high melting temperature of polyamide (A) and the consequent high temperature at which the melt-mixing in step (c) is done, results in a relative fast reaction and relative short reaction times are needed for the transamidation. Overall, less side reactions occur and the risk of gelation is reduced in each of the individual steps as well as in the overall process. The process further allows for a great flexibility in preparing high melting copolyamides with different monomer combinations and different monomer ratio's. The molded products have mechanical and thermal properties about equal or even superior to copolyamides prepared from corresponding diamines and dicarboxylic acids in one integral process.

Preparation of semi-aromatic copolyamides by melt-mixing of polyamides and transamidation is mentioned in WO11069942A1. For the preparation of the polyamides only conventional methods are mentioned. Nothing is mentioned about the preparation method of the polyamides, nor about direct solid state polymerization, nor about any effect of the transamidation, neither about the extent of it.

The formation of a miscible blend in the process according to the invention can be observed from forming a more transparent melt and from lowering of the melting temperature of polyamide (A). The formation of the copolyamide will be the result of transamidation and can be observed, in case for polyamide (B) a semi-crystalline polyamide is used, from disappearance of a separate melting temperature for polyamide (B). Furthermore, the melting temperature of polyamide (A) will become lower as that will become the melting temperature for the copolyamide. Depending on the level of transamidation, the copolyamide will initially be a block-copolymer, and upon further transamidation, result in a more randomized copolyamide or even a highly randomized copolyamide. A schematic representation of the structure of the copolymers formed as a result of transamidation reactions, going from an initial blend via a block copolymer with single blocks to a block copolymer with multiple blocks to a fully random copolymer can be found in Walia et al., Polymer engineering and science, 1999, 39 (12), 2431. The level of randomization can be determined by standard 13C-NMR methods (cf. A. M. Aerdts, K. L. L. Eersels, and G. Groeninckx, Macromolecules 1996, 1041: Transamidation in melt mixed aliphatic and aromatic polyamides 1). The Co-PA obtained with the process according to the invention typically has a melting temperature (Tm-Co-PA) below Tm-A. Upon prolonged retention of the Co-PA at a temperature above the solidification point of the Co-PA, for example during further melt-processing in a compounding step and/or in an injection molding step, transamidation can further progress and Tm-Co-PA will drop even more, until complete randomization has been achieved.

The melting temperature Tm-A of the semi-crystalline semi-aromatic polyamide (A) used in the process according to the invention is at least 310° C. Tm-A can be much higher than 310° C., as long as polyamide (A) remains melt-processable. Suitably, Tm-A is in the range of 310° C.-375° C. Preferably Tm-A is at least 320° C., more preferably at least 325° C. It has been observed that polyamide (A) prepared by direct solid-state polymerization has a good melt stability; though occasionally some increase in viscosity is observed, however, no gelation is observed, thus allowing Tm-A to be much higher. A higher Tm-A has the advantage that a Co-PA with a higher Tm is obtained or that a larger amount of polyamide (B) can be admixed with polyamide (A), i.e. the ratio polyamide (B)/polyamide (A) can be higher, while still retaining a Co-PA having a melting temperature of at least 300° C. Also preferably Tm-A is at most 360° C., more preferably at most 350° C. A lower Tm-A has the advantage that both polyamide (A) and polyamide (B) can be melt processed while being exposed to a lower melt-processing temperature. Most preferably, Tm-A is in the range of 330° C.-350° C. This provides a good optimum in increasing Tm-Co-PA and limiting high temperature exposure of polyamide (B).

With the term melting temperature is herein understood the melting temperature determined as the peak temperature for the endothermic melting peak measured by DSC by the method according to ISO 11357-3 (2011) with a scan rate of 20° C./min in the first heating cycle.

With the term glass transition temperature is herein understood the temperature, measured by DSC by the method according to ISO-11357-2 (2013) with a heating rate of 20° C./minute and determined as the temperature at the peak of the first derivative, with respect of time, of the parental thermal curve corresponding with the inflection point of the parent thermal curve in the second heating cycle.

With the term semi-crystalline polyamide is understood a polyamide that comprises a crystalline phase and an amorphous phase, thus being partially crystalline and partially amorphous. The crystalline phase is evidenced by a melting peak in a DSC measurement as mentioned above and the amorphous phase is evidenced by an inflection point in a DSC measurement as mentioned above.

An amorphous polyamide is herein understood a polyamide that does not show a melting temperature in the first and second heating curve in a DSC measurement as mentioned above.

The solidification point of a polyamide melt is dependent on the cooling speed and can be determined by routine experiments.

A semi-aromatic polyamide is herein understood a polyamide comprising repeat units derived from components comprising aromatic groups next to repeat units derived from components not comprising aromatic groups. Polyamide (A) comprises repeat units derived from dicarboxylic acid and diamine. The dicarboxylic acid component comprises primarily terephthalic acid. The diamine component suitably comprises or even fully consists of aliphatic diamine.

In the process according to the invention, polyamide (A) is prepared by a process step comprising direct solid-state polymerization of a diamine/dicarboxylic acid salt. Throughout such a direct solid-state polymerization process the reacting components and products are kept in a solid state. At least during a first part of the direct solid-state polymerization process the temperature is kept below the melting temperature of the salt. Once the salt is fully converted into a polyamide polymer, the polymer may be further polymerized by solid-state post condensation at a temperature below the melting temperature of the polyamide to further increase its molecular weight. Such a process including the further polymerization may also be fully carried out below the melting temperature of the salt. The result is that the reactants in the salt and the resulting polymer have been kept in solid state throughout the polymerization. The polymer polyamide (A), before being used in a melt-processing step (c) of the process according to the invention, has not been in a solution or melt phase, and therefore has a nascent morphology having characteristics, such as appearance of particles, having a shape with similarities to those of the diamine/dicarboxylic acid salt particles used for the polymerization. A picture of polyamide particles for a polyamide prepared by direct solid-state polymerization is shown in FIG. 1.

Another aspect is that the polyamide (A) with such nascent morphology has a high crystallinity as evidenced by a high melting endotherm measured by DSC in the first heating cycle. Suitably, polyamide (A) has melting endotherm (ΔHm) of at least 60 J/g, for example between 70 J/g and 150 J/g, or between 80 and 135 J/g.

The diamine/terephthalic acid salts used for the preparation of polyamide (A) may be prepared by any method suitable for preparing salts of terephthalic acid and diamines. For example, the salts can be prepared by dissolving terephthalic acid and diamine, and optionally further components, in water, eventually under heating, and precipitating the salt by cooling or by adding a non-solvent, eventually during or after cooling.

With the melting endotherm is herein understood the endotherm determined for the endothermic melting peak measured by DSC by the method according to ISO 11357-3 (2011) with a scan rate of 20° C./min in the first heating cycle.

Polymer polyamide (B) may be prepared by any conventional polymerization process, suitable for the type of polyamide involved. Suitably, polyamide (B) is obtained by a process comprising a melt-polymerization or solution polymerization step, or a combination thereof, optionally combined with a solid-state post condensation step. Herein the reactants, being either a single diamine/dicarboxylic acid salt, or multiple diamine/dicarboxylic acid salts, or α,ω-aminocarboxylic acids or the corresponding lactams, or any combination thereof, can be prepared in a solvent, or dissolved in a solvent, or prepared or brought into a melt. During such process the reactants have lost their original shape and the resulting polymer does not have characteristics that resemble the appearance of original salt particles.

In a particular embodiment, polyamide (B) is prepared by, and obtained from a direct solid state polymerization process. This embodiment is particularly favorably applied for combinations of polyamide (A) and polyamide (B), resulting in a copolyamide of which the monomer combinations severally complicate or prohibit the preparation of the copolyamide by direct solid-state polymerization. This can be the case, for example, wherein polyamide (B) consists fully of aliphatic components. Salts of fully aliphatic components, i.e. both aliphatic diamines and aliphatic dicarboxylic acids, typically have a much lower melting temperature than salts of corresponding aliphatic diamines and aromatic dicarboxylic acids (semi-aromatic salts).

The advantage of such a process, wherein both polyamide (A) and polyamide (B) are each, but separately prepared by a direct solid state process, rather than in a single combined direct solid state process, is that different reaction conditions can be applied for the separate polyamides: for the lower melting fully aliphatic salts, because of their higher reactivity a lower reaction temperature can be applied, however, these salts typically also result in intermediate prepolymer polymer products with a relative low melting point. For higher melting salts, such as the semi-aromatic salts of aliphatic diamines and terephthalic acid, also typically resulting in intermediate prepolymers and polymers with a higher melting temperature, a higher reaction temperature well above the melting temperature of the fully aliphatic salts, is more favorable, such higher reaction temperatures in combination with overall relative short reaction times can be applied in absence of the low melting fully aliphatic salts, thus allowing for applying optimal processing conditions with reduced risk of sticking. Also in cases where the copolyamide contains only aromatic dicarboxylic acid, for instance terephthalic acid, and three or more different diamines, and in particular when comprising long chain diamines, it is advantageous to prepare polyamide A and B separately as in these cases, intermediate prepolymer with relative low melting points are formed as well and required low temperature increase during direct solid state polymerization to avoid sticking and fouling.

In the process according to the invention polyamide (A) and polyamide (B) can be chosen from a wide range of polyamides and mixed in different ratios while still obtaining a semi-crystalline semi-aromatic copolyamide with a melting temperature of at least 300° C.

Polyamide (A) consists of repeat units derived from components comprising a dicarboxylic acid component and a diamine component, and consisting of 45-50 mol % terephthalic acid;
    47.5-50 mol % of diamine; and
    0-5 mol % of one or more other amine and/or acid group containing components, wherein the mol % is relative to the total molar amount of the said amine and/or acid group containing components in the repeat units. Terephthalic acid is herein understood to be an acid group containing component, while diamine is herein understood to be an amine group containing component Polyamide (A) may comprise one or more other amine and/or acid group containing components next to terephthalic acid and the diamine.

Next to terephthalic acid, a small amount of one or more other aromatic dicarboxylic acids may be present, such as isophthalic acid, 4,4-diphenylene dicarboxylic acid, and naphthalene dicarboxylic acid, or any combination thereof. The amount thereof shall be limited in order not increase the melting temperature too much, for example above 370° C., and/or not to hamper the direct solid-state polymerization. The amount of such other dicarboxylic acids is suitably at most 10 mol %, relative to the total molar amount of dicarboxylic acids in polyamide (A). Preferably, the terephthalic acid content is in the range of 95 mol-100%, and the amount of other aromatic dicarboxylic acids is in the range of 0-5 mol %, relative to the total molar amount of dicarboxylic acids in polyamide (A). Most conveniently, polyamide (A) is based on terephthalic acid as the only dicarboxylic acid.

The other components may also comprise one or more components other than diamines and aromatic dicarboxylic acids, such as adipic acid, or a mono-functional diamine component, a tri- or four-functional diamine component, a mono-functional carboxylic acid component, a tri-or four-functional carboxylic acid component, or a aw-aminocarboxylic acid, or any combination thereof. The amount thereof shall be limited in order not to decrease the melting temperature Tm-A too much, for example below 310° C., and/or not to hamper the direct solid-state polymerization. Preferably, such components are used in an amount of at most 2.5 mol %, more preferably in the range of 0-1 mol %, relative to the total molar amount of amine and/or acid group containing components in the polyamide.

The diamine component in polyamide (A) may consist of one diamine only, but may also consist of a combination of different diamines, for example two or three different diamines. Suitably, the diamine component consists of one or more diamines selected from C2-C12 diamines, i.e. diamines with 2-12 carbon atoms.

In a preferred embodiment, polyamide (A) is a homopolyamide derived from terephthalic acid and one diamine selected from aliphatic C5-C11 diamines. With a homopolyamide is herein understood a polyamide consisting essentially of repeat units derived from one dicarboxylic acid, in casu terephthalic acid, and one diamine, and at most 1 mol % of other components.

Preferably, the homopolyamide is selected from PA 5T, PA 6T, PA 7T, PA 8T, PA 9T, and PA 10T. Herein the C5-C10 diamine is a linear diamine. PA 4T is not suited, since it does not melt but degrades at elevated temperature. PA 6T may be used, even though this would require a melt process temperature above 370° C. The advantage is that the transamidation will proceed very fast. PA 6T is suitably applied in process equipment allowing a melt-process step with a short residence time for the melt stage at a temperature above 370° C. After the PA 6T has been melted, and a mixed melt has been formed, the resulting mixed melt can be cooled to a lower temperature, below the melting temperature of PA 6T while still being above the crystallization temperature of the melt, thereby taking advantage of the fast transamidation, while limiting the occurrence of side reactions.

More preferably, the homopolyamide is selected from PA 7T, PA 8T, PA 9T, and PA 10T. These polyamides have a melting temperature Tm-A in the range between 310° C. and 350° C. The advantage is that these polyamides may be processed in a melt process below or around 370° C.

For the nomenclature of the polyamides applied herein above and below, the designation system according to ISO 1874-1:2010 has been used.

In another preferred embodiment, the polyamide (A) is a copolyamide derived from terephthalic acid and at least two diamines comprising at least one diamine selected from aliphatic C2-C12 diamines. More particularly, the copolyamide consists essentially of repeat units derived from terephthalic acid and at least two diamines selected from aliphatic C2-C12 diamines, and at most 1 mol % of other components.

Preferably, the aliphatic C2-C12 diamines are linear diamines. Examples of suitable copolyamides for polyamide (A) include PA 4T/6T, PA 4T/8T, PA 4T/10T, PA 6T/8T and PA 6T/10T, PA 8T/10T, and any copolyamides thereof. An example of a suitable copolyamide is PA 4T/6T/10T.

More preferably, the at least two diamines comprise at least one diamine selected from linear aliphatic C2-C6 diamine, even more preferably at least one diamine selected from 1,4-butanediamine and 1,6-hexamethylenediamine.

Most conveniently, polyamide (A) is a PA 4T/XT copolyamide or a PA 6T/XT copolyamide based on terephthalic acid (represented by "T") and 1,4-butanediamine (represented by "4") or 1,6-hexamethylenediamine (represented by "6"), wherein X is another linear aliphatic diamine selected from 1,4-butanediamine (a C4-diamine), 1,6-hexamethylenediamine (a C6 diamine), 1,8-octamethylenediamine (a C8-diamine) or 1,10-decanediamine (a C10-diamine), or any combination thereof, and wherein polyamide (A) has a melting temperature Tm-A in the range of 325-350° C. The advantage is that copolyamides resulting thereof as prepared by the process according to the invention have a high crystallinity and a high glass transition temperature. Most preferred, polyamide (A) is a PA 4T/XT copolyamide. The advantage is that this copolyamide has a high miscibility with a wide range of polyamides for polyamide (B), including other semi-aromatic polyamides, in particular PA XT, with X being a diamine with at least 7 carbon atoms and preferably being C8-diamine, C10 diamine, and/or C12 diamine, as well as aliphatic polyamides, in particular aliphatic diamines derived from C4-C10 diamines and adipic acid.

Polyamide (B) suitably comprises (B1) an amorphous semi-aromatic polyamide, (B2) a semi-crystalline semi-aromatic copolyamide, (B3) a semi-crystalline aliphatic polyamide, or (B4) a semi-crystalline semi-aromatic homopolyamide, or any combination thereof.

(B2) can be either (B2a) a semi-crystalline semi-aromatic copolyamide comprising repeat units derived from aliphatic dicarboxylic acids and aromatic dicarboxylic acids, or (B2b) a semi-crystalline semi-aromatic copolyamide comprising repeat units derived from terephthalic acid and isophthalic acid, or (B2c) a copolyamide thereof.

Examples of suitable polyamides for polyamide (B) include an amorphous semi-aromatic polyamide (B1) selected from PA 6I (e.g. Durethan T40 from Lanxess), PA 6I/6T, PA 6I/66, and PA NDT/INDT, (e.g. marketed under the name Trogamid®) by Evonik), PA DT (where D is 2-methylpentamethylenediamine), and PA MACMI/12, and any copolyamides thereof;

In one preferred embodiment, polyamide (B) comprises, or even consists of an amorphous PA 6I/6T copolyamide, more preferably an amorphous PA 6I/6T copolyamide with a glass transition temperature (Tg-B) of at least 130° C. The advantage thereof that a Co-PA with a relative high Tg is obtained.

Suitably, polyamide (B) comprises a semi-crystalline semi-aromatic copolyamide (B2) selected from PA XT/YI, PA XT/YI/Z, PA XT/Y6 or PA XT/N6/Z copolyamide, or any copolyamide thereof, based on terephthalic acid (represented by T) and isophthalic acid (represented by I) or terephthalic acid and adipic acid (represented by "6"), or a combination thereof, with X and Y representing diamines, and optionally comprising other repeat units (represented by "Z") derived from one or more other components. Preferably, at least one of X and Y being selected from 1,4-butanediamine and 1,6-hexamethylenediamine, The semi-crystalline semi-aromatic copolyamide may also comprise a PA XT/YT copolyamide wherein one of X and Y being selected from 1,4-butanediamine and 1,6-hexamethylenediamine, and wherein the other diamine comprises a branched diamine, e.g. 2-methylpentamethylene-diamine. Suitably, the semi-crystalline semi-aromatic copolyamide (B2) selected from PA 6/4T, PA 6/6T, PA 6/10T, PA 6/12T, PA 610/6T, PA 612/6T, PA 614/6T, PA 6/6T/6I, PA D6/66/6T, PA 6T/DT, PA 1010/10T, PA 1010/1210/10T/12T, PA 11/4T, PA 11/6T, PA 11/10T, PA 11/12T, PA 12/4T, PA 12/6T, PA 12/10T, PA 1212/12T, PA 66/6T, PA 6I/6T, PA 66/6I/6T, PA 6T/6I, PA 6T/66, PA 6T/46, PA 6T/6, PA 6T/6I/66, PA 6T/6I/46 and PA 6T/6I/6, and any copolyamides thereof. The semi-crystalline semi-aromatic copolyamide may also be derived from an aromatic diamine and an aliphatic dicarboxylic acid, such as PA MXD6.

In a preferred embodiment, polyamide (B) comprises, or even consists of a semi-crystalline semi-aromatic copolyamide (B2) having a melting temperature (Tm-B) in the range of 250° C.-300° C.

Examples of suitable polyamides for polyamide (B) include a semi-crystalline aliphatic polyamide (B3) selected from PA 6, PA 8, PA 10, PA 11, PA 12, PA 66, PA 610, PA 612, PA 1010, PA 46, PA 48, PA 410 and PA 412, and any copolyamides thereof.

Examples of suitable semi-crystalline semi-aromatic homopolyamides (B4) include PA XT, in which T represents terephthalic acid and X represent a diamine with 8-16 carbon atoms. In a preferred embodiment, the PA XT is selected from PA 8T, PA 9T, PA 10T, PA 11T and PA 12T, Examples of suitable combinations of less compatible or non-compatible polyamides are high aromatic polyamides, more particular polyterephthalamides. Examples thereof are polyterephthalamides comprising different diamines, such as PA4T/6T combined with PA XT; and PA 6T combined with PA XT, with PA XT being either PA 10T or PA 12T.

In a further preferred embodiment, polyamide (B) comprises, or even consists of a semi-crystalline aliphatic polyamide having a melting temperature (Tm-B) in the range of 220° C.-300° C. More preferably, said semi-crystalline aliphatic polyamide is an aliphatic polyamide with a C/N ratio in the range of 4-7. With the C/N ratio is herein understood the ratio between the number of carbon atoms (C) and the number of nitrogen atoms (N) in the polyamide. Suitable examples include PA 46, PA 6, PA 66 and PA 410, and copolyamides thereof. Most preferably the C/N ratio is in the range of 5-6. The aliphatic polyamide is suitably chosen from PA 46, PA 6 and PA 66 and copolyamides thereof. Also more preferably, Tm-B is in the range of 250° C.-300° C.

The ratio in which polyamide (A) and polyamide (B) are mixed can be varied over a wide range while still obtaining a semi-crystalline semi-aromatic copolyamide with a melting temperature of at least 300° C. This range will depend on the type of polyamides used, and more particular on the initial melting temperatures (Tm-A) and (Tm-B) and the desired melting temperature of the Co-PA. Suitably, polyamide (A) and polyamide (B) are mixed in a weight ratio NB in the range of 65/35-99/1.

The ratio between polyamide (A) and polyamide (B), denoted as the NB ratio, is herein expressed as a weight ratio. With (Tm-A) being relatively high, for example above 350° C., a higher amount of polyamide (B) can be mixed, corresponding with a lower NB ratio. However, typically polyamide (A) will amount to at least 50 wt. %, corresponding with an NB ratio of at least 50/50. Preferably, the ratio is at least 55/45.

With (Tm-A) being relatively low, for example in the range of 310° C.-325° C., a lower amount of polyamide (B) can be mixed, corresponding with a lower ratio A/B. Preferably, the A/B ratio is at least 75/25.

In a preferred embodiment Tm-A and Tm-B differ at least 30° C., preferably at least 50° C. It has been observed that using a polyamide (B) with a lower melting point, or even using an amorphous polyamide for polyamide (B), does not necessarily lead to a further lowering of Tm-Co-PA, in particular if polyamide (B) is used in an amount of at most 25 wt. %. This allows for preparing a Co-PA from a polyamide (B) prepared at even lower temperature, while still obtaining a Co-PA with a relative high melting temperature.

Although polyamide (B) may be admixed with polyamide (A) in an amount of 1 wt. % or lower, this has little effect on the melting temperature and other properties of the resulting Co-PA. Suitably, a larger minimal amount of polyamide (B) is mixed, for example corresponding with an A/B weight ratio of at most 95/5, or even at most 90/10. Preferably, polyamide (B) is mixed with polyamide (A) in such an amount that the resulting Co-PA, after further processing, i.e. in a molded part made of the Co-PA, has a melting temperature (Tm-Co-PA) of at least 5° C. below Tm-A, more preferably at least 10° C. below Tm-A.

The polyamides polyamide (A) and polyamide (B) may each have molecular weights varying over a wide range. The molecular weights and the corresponding viscosities may also be different from one another.

Suitably, polyamide (A) has a viscosity number (VN), in the range of 50-135 ml/g. A higher VN than 135 ml/g or lower than 50 ml/g may also be applied. Preferably the VN is 50-120 ml/g. A VN of at least 50 ml/g favors the melt-mixing process in a mixing apparatus like in an extruder. A VN of at most 120 ml/g is conveniently applied, as this limits the post-condensation time needed to obtain such high viscosities.

The VN is herein measured in 96% sulphuric acid (0.005 g/ml) at 25° C. by the method according to ISO 307, fourth edition.

Suitably, polyamide (B) has a viscosity number (VN), in the range of 20-300 ml/g. A VN in the range of 20-50 ml/g is favorably applied to obtain a copolyamide with better melt-flow properties, without adversely affecting the melt-mixing process in a mixing apparatus like in an extruder. A VN in the range of 200-300 ml/g is favorably applied to obtain a copolyamide with a higher molecular weight and better mechanical properties. Since the melt-mixing is performed at a temperature well above Tm-A, such high VN values do not raise problems in the melt-mixing process.

The weight average of the VN of polyamide (A) and polyamide (B) used in the process according to the invention is suitably in the range 50-180 ml/g, preferably 60-120 ml/g.

The Co-PA product resulting from the process according to the invention suitably has a VN in the range of 60-250, preferably 70-180 ml/g.

Polyamide (A) can have end groups comprising COOH groups in an amount of 100-250 meq/kg and NH2 groups in an amount of 20-150 meq/kg. The amounts of these end groups [NH2] and [CO2H] are herein determined by 1H-NMR, for which 97 weight % sulfuric acid is used as a solvent. A 5 weight % solution was prepared by dissolving the product into the solvent. A FT-NMR type Bruker 400 MHz with a Crio Probe was used for the measurement to obtain a 1H-NMR spectrum. The measurement is done at room temperature. For the quantification, the integrals corresponding to the NH2 end groups or CO2H end groups were taken from the 1H NMR in relation to the total integral of the 1H-NMR spectrum.

In a preferred embodiment, the amount of amine groups in polyamide (A) is at least 30 meq/kg. The advantage thereof is, that the transamidation is faster.

In another preferred embodiment, the calculated product of number of carboxylic end-groups and amine end-groups is at most 10,000 (meq/kg)2. This has the advantage that the viscosity of the resulting Co-PA is more easily controlled. More preferably, said calculated product for COOH*NH2 is in the range from 5,000 (meq/kg)$^2$ to 10,000 (meq/kg)$^2$. The advantage thereof is that the transamidation is faster, while simultaneously the increase in viscosity number is limited.

The process for preparing the Co-PA comprises a melt-mixing step, which requires polyamides polyamide (A) and polyamide (B) to be heated to a temperature above their respective melting temperatures Tm-A and Tm-B, more preferably at least 10° C. above said temperatures. The resulting mixed polymer melt may have a temperature also above Tm-A, the highest of the two said melting temperatures, but not necessarily so. When polyamides polyamide (A) and polyamide (B) are heated and melted separately, and mixed without further heating, the resulting mix will have attained a temperature between that of the melt of polyamide (A) and the melt of polyamide (B). Suitably, polyamides polyamide (A) and polyamide (B) are mixed while heating, and thereby both being heated to a temperature also above Tm-A, resulting in a mixed polymer melt having a temperature above Tm-A. Preferably, T-melt is at least 10° C. above Tm-A. The advantage of the melting temperature of the resulting mixed polymer being above Tm-A has the advantage that the transamidation proceeds faster and that the time needed for sufficient transamidation to result in a more randomized copolyamide is shorter.

The preparation of the Co-PA with the process according to the invention may be combined with a compounding process for preparing a thermoplastic polyamide molding composition. Therefore, in a preferred embodiment, at least one other component is added in step (b) of the process according to the invention. Suitably, the other component, or two or more other components, are selected from r0einforcing agents, -such as glass fibers-, flame retardants, stabilizers, processing aids, and other auxiliary additives generally applied in thermoplastic polyamide molding compositions. In such combined compounding process the other components used are preferably selected from components that can withstand the high processing temperatures, i.e. the components should not decompose, and components that do not deteriorate the polyamide, or in limited extend only. Adding other components prior or during the melt-mixing can lead to a further increase in processing temperature, in particular with solid components, e.g. glass fibres, inorganic fillers and inorganic flame retardants.

In a preferred embodiment, the other component, or other components, if any, are added after the melt-mixing step. This has the advantage that the temperature during the melt-mixing step can be kept lower and the risk of deterioration of polyamide and/or other components is less.

More preferably, the Co-Pa is first prepared by melt-mixing, extruded cooled and granulated, and then compounded in a further step with one or more other components. Thus, the Co-PA prepared with the process according to the invention may also be used in a separate compounding step for preparing a thermoplastic polyamide molding composition. Herein the Co-PA obtained from step (iii) is heated to a temperature above Tm-Co-PA and melt-mixed with at least one other component, and subsequently cooled.

In another preferred embodiment, the process according to the invention comprises a further step, wherein the solid semi-crystalline semi-aromatic polyamide copolymer (Co-PA), or the thermoplastic polyamide molding composition comprising the Co-PA and at least one other component is processed in a further step, wherein the Co-PA or the molding composition is heated to a temperature above Tm-Co-PA, injected into a mold, cooled, and discharged from the mold, thereby obtaining a molded part comprising the Co-PA.

The advantage of these further steps is that transamidation has further proceeded, resulting in a copolymer with an even more random distribution of monomeric units in the chain.

Preferably, during the further processing step or further processing steps, the Co-PA is retained at a temperature above the melting temperature Tm-Co-PA for at least 2 minutes, more preferably at least 3 minutes.

The process for preparing the Co-PA by melt-mixing according to the invention can be carried out in any apparatus that is suitable for melt-mixing polyamides. The melt-mixing can be carried out, for example, in a twin-screw extruder.

By extending the residence time in the extruder, a more homogeneous blend is obtained and transamidation can proceed further, if not yet completed. Suitably, the process is carried out in a mixing apparatus, such that the mixed melt has a mean residence time in the range from 30 seconds to 7.5 minutes, preferably from 60 seconds to 5 minutes. Herein the mean residence time is the volume of free active space of the melt-mixing apparatus divided by the volume of polymeric material transported through the free space per minute. For an extruder, this free active space is the volume of the extruder barrel minus the volume of the screw or screws in the extruder barrel. The volume of the polymeric material is herein the calculated by the weight of the polymeric material exiting the melt-mixing apparatus divided by the density of the polymeric material that has exited the melt-mixing apparatus. The values for density and volume used herein are the values measured at 20° C.

The process is suitably also carried out such that the Co-PA obtained after the cooling step, has a melting temperature Tm-Co-PA of at least 2.5° C. below the melting temperature Tm-A of polyamide (A), preferably at least 5° C. below said temperature.

The process step wherein the Co-PA or the thermoplastic polyamide molding composition comprising the Co-PA and at least one other component is heated to a temperature above Tm-Co-PA and processed in a further step, can be carried out in any apparatus that is suitable for molding thermoplastic polyamide molding compositions. The heating and further processing can be carried out, for example, in a single-screw extruder.

FIG. 1 shows a picture of polyamide particles for a polyamide prepared by direct solid-state polymerization.

The invention is further illustrated with the following examples and comparative experiment.

Experimental Part
Measurements
Mechanical Properties

The mechanical properties (tensile modulus [MPa], tensile strength [MPa], elongation at break [%]) were measured in a tensile test according to ISO 527-1/2:2012 at 23° C. The dried granulate was injection molded in a mold to form test bars conforming ISO 527 type 1A.

Determination of Tm by DSC (According to ISO-11357-3: 2011).

The measurements of the melting temperature Tm were carried out with a Mettler Toledo Star System (DSC) using a heating and cooling rate of 20° C./min. in an N2 atmosphere. For the measurements a sample of about 5 mg pre-dried powdered polymer sample was used. For the measurements of melt-processed material a thin flat slice with a mass of about 5mg was cut from extruded material.

The pre-drying was carried out at high vacuum, i.e less than 50 mbar and a 105° C. during 16 hrs. The sample was heated from 0° C. to a temperature about 30° C. above the melting temperature at 20° C./min, immediately cooled to 0° C. at 20° C./min and subsequently heated to about 30° C. above the melting temperature again at 20° C./min. For the melting temperature Tm the peak value of the melting peak in the first heating cycle was determined.

Determination of Tg by DSC (According to ISO-11357-2 (2013).

The measurement of the glass transition temperature (Tg) were carried out by DSC measurements as described above for the Tm, wherein the Tg was determined as the temperature at the peak of the first derivative, with respect of time, of the parental thermal curve corresponding with the inflection point of the parent thermal curve in the second heating cycle.

Viscosity Number

The viscosity number (VN) was measured in 96% sulphuric acid at a polymer concentration of 0.005 g/ml at 25° C. by the method according to ISO 307, fourth edition.

Determination of COOH and NH2 Groups

The amounts of end groups [NH2] and [CO2H] were determined by 1H-NMR, for which 97 weight % sulfuric acid was used as a solvent. A 5 weight % solution was prepared by dissolving the product into the solvent. A FT-NMR type Bruker 400 MHz with a Crio Probe was used for the measurement to obtain a 1H-NMR spectrum. The measurement is done at room temperature. For the quantification, the integrals corresponding to the NH2 end groups or CO2H end groups were taken from the 1H NMR in relation to the total integral of the 1H-NMR spectrum.

Materials

| | Monomeric Starting Materials |
|---|---|
| Terephthalic acid | Industrial grade (BP Amoco); 0.05 wt. % water |
| 1,4-butanediamine | Industrial grade (DSM); <0.5 wt. % water |
| 1,6-hexamethyl-enediamine | Industrial grade (Sigma Aldrich); <0.5 wt. % water |
| 1,10-decane diamine | Industrial grade (Sigma Aldrich); 97% pure |
| Glass fibers | GF-standard grade for polyamide injection molding compositions. |

The following polymeric materials were used for the experiments (all from DSM):

| | |
|---|---|
| PA-1 | PA 4T/6T/66 copolymer with a melting temperature of 325° C., VN 80 ml/g, prepared by a conventional process involving aqueous solution polymerization, flash isolatation of the prepolymer as powder, followed by solid state post condensation of the powder |
| PA-2 | PA 6 with a melting temperature of 220° C., VN 130 ml/g, prepared by a conventional process involving melt polymerization, followed by solid state post condensation |
| PA 3 | PA 410 with a melting temperature of 245° C., VN 150 ml/g, prepared by a conventional process involving aqueous solution polymerization, followed by solid state post condensation |
| PA-4 | PA 66 with a melting temperature of 260° C., VN 125 ml/g, prepared by a conventional process involving melt polymerization, followed by solid state post condensation |
| PA-5 | PA 46 with a melting temperature of 295° C., VN 160 ml/g; prepared by a conventional process involving aqueous solution polymerization, followed by solid state post condensation |
| PA-6 | Novamid X21, PA 6I/6T, amorphous polyamide with a glass transition temperature of 125° C., prepared by a conventional process involving melt polymerization, |
| PA-7 | PA 66 with a melting temperature of 260° C., VN 134 ml/g, prepared by a conventional process involving melt polymerization, followed by solid state post condensation |

Preparation PA 6T/4T a. Salt Preparation

A mixture of 1225 g of terephthalic acid was charged into a 10 liter baffled flask, attached to a rotary evaporator, equipped with a heated diamine dosing vessel was kept under an inert nitrogen atmosphere and mixed by rotation at 5 rpm. The rotating flask was partially submerged in a water bath, maintained at 60° C. to remove the heat of neutralization. A liquid mix of 528 g 1,6-hexamethylenediamine and 286 g 1,4-butanediamine of 60° C. was added drop-wise to the acids in 4 hours under constant rotation. After dosing, the reaction mixture was stirred by rotation at a water batch temperature of 60° C. for another 30 minutes. After the experiment salt in the form of loose powder was obtained. The powder had a melting temperature of 280° C.

This recipe was repeated several times and the batches were mixed to obtain a homogeneous powder mixture.

b. Direct Solid State Polymerization

A 50 liter tumble drier was charged with 10 kg of the salt. It was inertized by evacuation to 50 mbar and filling with nitrogen and repeating this 5 times. A nitrogen purge of 10 g/h was used. Then the mixture was heated in 2 hours to 200° C. and subsequently in 10 hours to 250° C., while allowing the reaction water to leave the tumble drier. Then the nitrogen stream was stopped and a mix of 130 g 1,6-hexamethylenediamine and 60 g 1,4-butanediamine of 60° C. was added during 1 hour, while keeping the temperature at 250° C. The mix was reacted another 2 hours. Then a nitrogen stream of 1 kg N2/hour was applied and the material cooled to room temperature. 8.5 kg of a white powder was obtained with a VN of 85 ml/g and a Tm of 342° C.

Compounding

EXAMPLES I-V AND COMPARATIVE EXPERIMENT A

Glass fiber reinforced compositions were prepared by melt mixing on a Berstorff ZE25/48 UTX (a co-rotating twin-screw extruder) operating at 350 rpm and using a wall temperature setting of 350° C. All polymeric materials were fed to the feed-throat of the extruder and the glass was fed downstream on the melt. The settings used resulted in a temperature of the melt exiting the die-head of approximately 370° C. The mean residence time of the molten polymers in the extruder was about 30 seconds.

Molding

Samples were injection molded into 527-1A specimen using an Engel110 injection molding machine equipped with a 25 mm screw. Temperature settings were chosen such that all samples were injected into the mold with a melt temperature of 350° C. Compositions and test results for the various experiments are shown in Table 1.

EXAMPLE VI

A non-filled non-reinforced copolyamide was prepared by melt mixing PA 6T/4T (end-groups and viscosity number as specified in Table 2) and PA #7 (PA 66 with a VN 134 ml/g) in a 85/15 weight ratio on a Berstorff ZE25/48 UTX (a co-rotating twin-screw extruder) operating at 350 rpm and using a wall temperature setting of 360° C. Both polymeric materials were fed to the feed-throat of the extruder. The settings used resulted in a temperature of the melt exiting the die-head of approximately 360° C. The mean residence time of the molten polymers in the extruder was about 120 seconds. Analytical data and test results are shown in Table 2.

EXAMPLES VII-X

Example VI was repeated except that PA 66 in combination with different grades of PA 6T/4T were used. The different grades for PA 6T/4T were prepared by using the direct solid state process as mentioned before while applying modifications in the polymerization time and/or in the amount of diamine added in the post-dosing step.

Analytical data and test results for Examples VI-X are shown in Table 2.

TABLE 1

Compositions and results for Examples I-V and Comparative Experiments A.

| Experiment | CE-A | EX-I | EX-II | EX-III | EX-IV | EX-V |
|---|---|---|---|---|---|---|
| PA-1 | 70 | | | | | |
| PA 6T/4T | | 59.5 | 59.5 | 59.5 | 59.5 | 59.5 |
| PA-2 | | 10.5 | | | | |
| PA-3 | | | 10.5 | | | |
| PA-4 | | | | 10.5 | | |
| PA-5 | | | | | 10.5 | |
| PA-6 | | | | | | 10.5 |
| GF | 30 | 30 | 30 | 30 | 30 | 30 |
| Properties after melt-mixing step | | | | | | |
| Tm [° C.] | 329.2 | 338.5 | 340.2 | 338.8 | 340.7 | 339.2 |
| VN granules [—] | 82.1 | 81.1 | 71.1 | 83.5 | 79.7 | 82.5 |
| Properties after molding | | | | | | |
| Tm [° C.] | 321.4 | 325 | 330.3 | 325.2 | 327.2 | 329.3 |
| delta H [J/g] | 49 | 47 | 43 | 48 | 45 | 48 |
| Tg [° C.] | 123.2 | 118.1 | 124.1 | 120.1 | 122.6 | 144 |
| modulus [MPa] | 11354 | 11838 | 12915 | 11578 | 11577 | 11315 |
| strength [MPa] | 151 | 186.8 | 195.6 | 184.3 | 170.1 | 185.7 |
| eab [%] | 1.63 | 1.93 | 2.11 | 1.96 | 1.86 | 2.07 |

The results show that the copolyamides of Examples I-V formed after the melt-mixing step had a lower melting temperature than the starting PA 4T/6T copolyamide (with Tm-A of 342) and even so more after molding as transamidation could continue during that step. Meanwhile, the melting temperature of Polyamide B had disappeared. Moreover the copolyamides of Examples I-V prepared by the process according to the invention had better mechanical properties than copolyamide used in Comparative Experiment A, which has a similar composition as that of Example III, but was prepared by a conventional process.

TABLE 2

Analytical data and test results for Examples VI-X

| | EX-VI | EX-VII | EX-VIII | EX-IX | EX-X |
|---|---|---|---|---|---|
| PA-B = PA-66 [wt. %] | 15 | 15 | 15 | 15 | 15 |
| PA-A = PA 4T/6T [wt. %] | 85 | 85 | 85 | 85 | 85 |
| Tm [° C.] PA-A | 342 | 343 | 342 | 343 | 342 |
| COOH [meq/kg] PA-A | 215 | 127 | 142 | 167 | 136 |
| NH2 (meq/kg) PA-A | 22 | 45 | 60 | 64 | 85 |
| VN [ml/g] PA-A | 71 | 85 | 83 | 77 | 79 |

TABLE 2-continued

Analytical data and test results for Examples VI-X

|  | EX-VI | EX-VII | EX-VIII | EX-IX | EX-X |
|---|---|---|---|---|---|
| Properties after melt-mixing step |  |  |  |  |  |
| Tm [° C.] | 335 | 334 | 334 | 334 | 332 |
| VN granules [ml/g] | 78 | 101 | 102 | 102 | 103 |
| Calculated numbers |  |  |  |  |  |
| COOH*NH2 [(meq/kg)$^2$] | 4730 | 5715 | 8520 | 10688 | 11560 |
| ΔTm (drop) [° C.] | 7 | 9 | 8 | 9 | 10 |
| ΔVN (increase, in ml/g) | 7 | 16 | 19 | 28 | 24 |
| COOH + NH2 [meq/kg] | 237 | 172 | 202 | 231 | 221 |

Though not reported in the table, it is mentioned here that in the polyamides resulting in all Examples VI-X, the melting temperature of polyamide 66 had fully disappeared. In all these examples, a drop in melting temperature of more than 5° C. is observed. These combined results are considered to be indicative for the occurrence of trans-amidation. Moreover an increase in viscosity number is observed for all these examples. This is interpreted that during the melt-mixing not only trans-amidation, but also some post-condensation has taken place. The observed increments in viscosity are considered to be within an acceptable range. For the viscosity measurements solutions of the copolyamides had to be prepared. That was feasible without any problem, due to absence of any visible gel-particles. The above results also show that a low content in amine end groups, as in Example VI, leads to a lower increase in viscosity number, but also in a slightly lower drop in melting temperature. These results are considered to be indicative that with a low content in amine end groups occurrence of post condensation is less, while at the same time trans-amidation is slower. With a higher amount of amine end groups, there is a somewhat larger drop in Tm, in combination with a further increase in viscosity. This increment in viscosity becomes in particular more significant when the calculated product of number of carboxylic end-groups and amine end groups becomes higher. When the calculated product for COOH*NH2 is over 10,000 (meq/kg)2, the viscosity increase in the chosen experimental set-up is well above 20. With the amount of amine groups above 30 meq/kg, the transamidation is favorably faster, while with COOH*NH2 in the range from 5,000 (meq/kg)$^2$ to 10,000 (meq/kg)$^2$, the increase in viscosity number is limited.

EXAMPLE XL

Preparation and Molding of PA6T/4T/66

For this experiment Example VIII was repeated except that as a mixing device a ZE40R twin-screw extruder was used and a shorter residence time was applied. PA4T/6T (Tm=342 C, VN=83 ml/gram) was mixed with PA66 in a 85/15 ratio (melt mixing step). The mixing time in the melt mixing step was 30 seconds at a temperature of 360° C. After this mixing step the resulting polymer was compounded into a 30% GF filled compound on the same twin-screw extruder (compounding step). In the compounding step the residence time was 30 seconds, final measured melt temperature was 390° C. As a final step the compound was molded into a tensile testbar on a 25 mm IM machine (molding step). In the molding step residence time was 150 sec at a temperature of 340 C. The results obtained with respect to Tm and VN characteristics after the several steps are shown in Table 3.

TABLE 3

Results for Example XI

|  | Tm1 (° C.) | VN (ml/g) |
|---|---|---|
| PA4T/6T initial | 342 | 83 |
| PA4T/6T/PA66 after melt mixing step | 339 | 84 |
| Compound after compounding step | 334 | 101 |
| Compound after molding step | 327 | 103 |

This result of the lower melting temperature in the end product shows that with the process according to the invention extensive transamidation is achieved, and a copolyamide is formed in an efficient manner, without exposing the polyamide excessively long to high temperature and without the use of a catalyst.

EXAMPLE XII

Preparation of Terpolymer from Two Polyterephthalates

XII-a: PA 10T Preparation by Direct Solid State Polymerization

A liquid mixture of 207.67 g (1.21 mol) 1,10-diaminodecane and 5367 g demineralized water was charged into a 6 litre 3 necked flask. Then, 196.33 g (1.18 mol) of terephthalic acid was added gradually over 10 minutes while stirring. The slurry was heated to reflux (+/−102° C.) resulting in a fully transparent solution. (In case the solution is not transparent, diamine is added gram by gram until a sample taken has a pH>7.) The salt solution was then cooled while stirring to 4° C. by cooling the flask in a water/ice bath. Faster cooling results in smaller crystals. The precipitated salt was obtained by filtration, washed with 200 ml ice cold water and dried overnight by allowing air to blow through the filter cake while still on the Büchner funnel. Then the salt was further dried for 8 hours at 60° C. under a vacuum (50 mbar absolute), resulting in 368 g (92% yield) of the salt in the form of fine white powder.

The polymerization of the 10T salt was carried out in a double walled 1 liter electrically heated metal reactor equipped with a helically shaped stirring unit, an inert gas inlet and an exit for the inert gas and the condensate gas to leave the reactor, and thermometers to measure the temperature of the reactor wall and the reactor content. The reactor was charged with salt powder. The salt powder was stirred and a nitrogen gas purge of 5 gram per hour was applied to inertize the reactor content. Then the reactor content was heated by heating the reactor wall applying a programmed temperature profile and monitoring the temperature of the reactor content in the powder bed, meanwhile continuing the nitrogen gas purge and stirring of the reactor content.

300 g of the salt of the 10T salt was used. The nitrogen gas purge was set and kept at 5 gram per hour gas volume at room temperature. The reactor content was inertized during 3 hours, before starting the heating profile. The reactor content was heated from 25 to 220° C. in 2 hrs, kept at 220° C. for 3 hours, heated to 235° C. in 5 hours and kept at 235° C. for 5 hours. Then 10 g of decanediamine was dosed nd the temperature kept for two more hours at 235° C., Then the reactor content was cooled to below 100° C. in 2 hours which resulted in a free flowing polymer. Yield 260 g, melting point Tm 316° C., VN 95 ml/g.

XII-b. Compounding PA 4T/6T with PA 10T.

PA4T/6T (Tm=342 C) and PA10T polymer were put into a mixing device in a 70/30 ratio. The polymers were mixed at a temperature of 350° C. for 60 seconds. A copolymer with a Tm of 335° C. was obtained after the mixing step.

Comparative Experiment B

Preparation of 46/66/4T/6T Salt and its Polymerization by Direct Solid State Polymerization B-1: Preparation of Granulated 46/66/4T/6T Salt 2380 gram of terephthalic acid powder and 385 gram of adipic acid powder were charged into a 15 litre plough-share mixer equipped with a gas inlet, a gas outlet led through a condenser. A mixture of 453 gram of 1,4-butane diamine and 1449 gram 1,6-hexane diamine was prepared in a jacketed vessel that was maintained at a temperature of 50° C. 2.25 g of sodium hypophosphitemonohydrate was dissolved in 13 g of water and added to the diamine mixture. At the start of an experiment the mixer was charged with the solid acids and inertized with a nitrogen purge. Then, the diamine mixture was dosed to the mixer at a rate of 30 ml/min while the agitator ran at 60 RPM. After the amine mixture was dosed, the mixer was heated to 100° C. and 90 ml of additional water was added in 3 minutes. The jacket was set to 110° C. and the system was allowed to reflux for 40 minutes. The jacket was then set to 150° C. and all water and excess amines were evaporated. After opening, the mixer contained a mixture of salt granules.

B-2 Direct Solid State Polymerization.

Three batches of salt granules of the above salt were collected and mixed. 10 kg of the mixed salt was subjected to direct solid state polymerization, applying the process as described above for PA6T/4T. While applying the same wall temperature profile for raising the temperature of the salt powder from 200° C. to 250° C., it appeared that the reactor content reached 225° C. in 6 hours time, but did not raise any further in temperature during the further heating. At the end of the procedure, the reactor content was cooled. After opening the dryer, a thick fluffy powder layer was stuck at the wall of the dryer. Analysis of the powder showed incomplete conversion to polymer. This result is attributed to the stickiness of the powder and the fouling of the reactor wall layer inhibiting heat transfer. This result shows that the process as applied is not suitable without modification, for example using lower reaction temperatures and slower heating, thereby requiring longer reaction times.

Comparative Experiment C

Preparation of PA-6T/4T/46 Salt (Mole Ratio 74.5/10.0/15.5) and Pelletizing the Salt.

A mixture of 1271 g tetramethylene diamine, 3501 g hexamethylene diamine, 4870 g water, 6.6 g sodium hypophosphite monohydrate, 916 g adipic acid and 5675 g terephthalic acid was stirred in a 25 litre autoclave with heating so-that an 91 wt. % aqueous salt solution was obtained after 22 minutes. During this mixing step the temperature increased to 176° C. Then the temperature was increased stepwise, first to 212° C., than to 220° C. Then the polymerisation was affected by further increasing the temperature from 220° C. to 226° C. for 22 minutes, during which the pressure rose to 1.4 Mpa. Then the autoclave's contents were flashed into an inertized vessel and crushed by rotating paddels. The solid prepolymer product was cooled further under nitrogen.

For making pellets of the prepolymer powder, a pelletizing method as described in EP0254367 was applied. 2 kg of the prepolymer was fed into a laboratory press with a horizontal flat die and a head equipped with two vertical mill stones. The die is provided with a diameter of 3mm and a length of 9 mm. No pellets could be obtained, but the apparatus was clogged by plasticized prepolymer, blocking the channels.

To convert the prepolymer into a high molecar weight product, the prepolymer could be subjected to a solid state post condensation process. However, for practical reasons, a powder is less suited for large scale production, and pellets would be more favourable, as these might be used for example in a packed moving bed reactor, with a counter flow of hot nitrogen. However, the problems encountered with pelletizing of the prepolymer above, prevented preparing a high molecular weight semi-aromatic polyamides using such a route.

The invention claimed is:

1. A process for making a semi-crystalline semi-aromatic polyamide copolymer (Co-PA), wherein the process comprises the steps of
   (a) providing a solid state polymerized first semi-crystalline semi-aromatic polyamide (A) having a melting temperature (Tm-A) of at least 310° C. which consists of repeat units derived from:
      (i) 45-50 mol % terephthalic acid;
      (ii) 47.5-50 mol % of a diamine; and
      (iii) 0-5 mol % of one or more other amine and/or acid group containing components, wherein
      the mol % is relative to the total molar amount of the amine and/or acid group containing components; and wherein
      the polyamide (A) is a direct solid-state polymerization reaction product of a diamine-dicarboxylic acid salt of the terephthalic acid and the diamine;
   (b) providing a polyamide (B) which is either:
      (i) an amorphous polyamide having a glass transition temperature (Tg-B) below Tm-A, or
      (ii) a second semi-crystalline polyamide having a melting temperature (Tm-B) below Tm-A, or
      (iii) a combination of the amorphous polyamide and the second semi-crystalline polyamide;
   (c) conducting a transamidation reaction between the polyamide (A) and the polyamide (B) by heating and melt-mixing the polyamide (A) and the polyamide (B) at a melting temperature (T-melt) sufficiently above Tm-A to thereby obtain a miscible polymer melt thereof and maintaining the melt for a sufficient mean residence time from 30 seconds to 7.5 minutes to form a semi-crystalline semi-aromatic polyamide copolymer (Co-PA) of the polyamide (A) and the polyamide (B) which has a melting temperature (Tm-Co-PA) which is at least 300° C. and at least 2.5° C. below Tm-A; and
   (d) cooling the melt of the Co-PA to a temperature below a solidification temperature thereof to thereby solidify the semi-crystalline semi-aromatic polyamide copolymer (Co-PA), wherein
   melting temperatures are determined by Differential Scanning Calorimetry (DSC) according to ISO 11357-3 (2011) with a scan rate of 20° C./min in a first heating cycle, and glass transition temperatures are measured by DSC according to ISO-11357-2 (2013) with a heating rate of 20° C./minute in a second heating cycle.

2. The process according to claim 1, wherein the polyamide (B) is prepared by melt-polymerization, solution polymerization, or a combination thereof, or by direct solid-state polymerization.

3. The process according to claim 2, wherein the polyamide (B) is prepared by direct solid-state polymerization combined with a solid-state post condensation step.

4. The process according to claim 1, wherein the melting temperature (Tm-A) is in a range of 310° C.-375° C.

5. The process according to claim 1, wherein the polyamide (A) is a terephthalate homopolymer derived from terephthalate (T) and a diamine (X) selected from C5-C11 diamines or a terephthalate copolymer derived from terephthalate (T) and at least two diamines selected from C2-C12 diamines.

6. The process according to claim 1, wherein the polyamide (A) is a PA 4T/6T copolyamide, a PA 6T/XT copolyamide, a PA 4T/XT copolyamide or any copolyamide thereof, wherein X is a diamine which is different from tertramethylene diamine and hexamethylene diamine.

7. The process according to claim 1, wherein the polyamide (B) is an amorphous semi-aromatic polyamide (B1), a semi-crystalline semi-aromatic polyamide (B2), a semi-crystalline aliphatic polyamide(B3), or any combination thereof.

8. The process according to claim 1, wherein the polyamide (A) is a PA 4T/6T copolyamide.

9. The process according to claim 1, wherein the polyamide (A) has a viscosity number (VN) in a range of 50-135 ml/g and/or the polyamide (B) has a VN in a range of 20-300 ml/g, wherein the VN is measured in 96% sulphuric acid (0.005 g/ml) at 25° C. according to ISO 307, fourth edition.

10. The process according to claim 1, wherein the polyamide (A) has COOH end groups in an amount of 100-250 meq/kg and NH2 end groups in an amount of 20-150 meq/kg.

11. The process according to claim 1, wherein step (c) comprises melt-mixing the polyamide (A) and the polyamide (B) in a weight ratio A/B of the polyamide (A) to the polyamide (b) which is in a range of 55/45-99/1.

12. The process according to claim 11, wherein the weight ratio A/B is in a range of 65/35-95/5.

13. The process according to claim 11, wherein the weight ratio A/B is in a range of 75/25-90/10.

14. The process according to claim 1, wherein Tm-Co-PA obtained after step (c) is at least 5° C. below Tm-A.

15. The process according to claim 1, wherein T-melt is at least 10° C. above Tm-A.

16. The process according to claim 1, wherein in step (b) comprises adding at least one other component.

17. The process according to claim 14, wherein Tm-Co-PA of the solid molded part is at least 5° C. below Tm-A.

18. The process according to claim 14, wherein Tm-Co-PA of the solid molded part is at least 10° C. below Tm-A.

19. The process according to claim 1, which further comprises:
(e) forming the solidified semi-crystalline semi-aromatic polyamide copolymer (Co-PA) obtained in step (d) into a solid molded part by heating the solidified Co-PA to a temperature above Tm-Co-PA to form a melt thereof, injecting the melt of the Co-PA into a mold, cooling the injected melt of the Co-PA in the mold to form a solid molded part of the Co-PA, and thereafter discharging the solid molded part of the Co-PA from the mold.

20. The process according to claim 1, wherein the mean residence time of the melt during melt-mixing of the polymer (A) and the polymer (B) according to step (c) is from 60 seconds to 5 minutes.

21. The process according to claim 1, wherein the polyamide (A) and the polyamide (B) are polyterephthalamides with different diamines.

* * * * *